a2 United States Patent
Miyamoto et al.

(10) Patent No.: US 11,235,462 B2
(45) Date of Patent: Feb. 1, 2022

(54) FORCE DETECTION SYSTEM AND ROBOT

(71) Applicant: Seiko Epson Corporation, Tokyo (JP)

(72) Inventors: Tsutomu Miyamoto, Shiojiri (JP); Toshiyuki Kamiya, Fujimi (JP)

(73) Assignee: Seiko Epson Corporation

( * ) Notice: Subject to any disclaimer, the term of this patent is extended or adjusted under 35 U.S.C. 154(b) by 606 days.

(21) Appl. No.: 16/190,560

(22) Filed: Nov. 14, 2018

(65) Prior Publication Data

US 2019/0145839 A1 May 16, 2019

(30) Foreign Application Priority Data

Nov. 15, 2017 (JP) .............................. JP2017-219664

(51) Int. Cl.
| | | |
|---|---|---|
| *G06F 17/00* | (2019.01) | |
| *B25J 9/16* | (2006.01) | |
| *G01L 5/00* | (2006.01) | |
| *B25J 19/02* | (2006.01) | |
| *B25J 13/08* | (2006.01) | |

(52) U.S. Cl.
CPC ........... *B25J 9/1633* (2013.01); *B25J 9/1694* (2013.01); *B25J 13/085* (2013.01); *B25J 19/02* (2013.01); *G01L 5/009* (2013.01)

(58) Field of Classification Search
CPC ...... B25J 9/1633; B25J 13/085; B25J 9/1694; B25J 19/02; G01L 5/009
USPC ........................................................ 700/258
See application file for complete search history.

(56) References Cited

U.S. PATENT DOCUMENTS

| | | | | |
|---|---|---|---|---|
| 4,786,847 A | * | 11/1988 | Daggett ................. | B25J 9/1633 318/568.2 |
| 5,825,308 A | * | 10/1998 | Rosenberg ............ | G06F 3/0354 341/20 |
| 6,061,004 A | * | 5/2000 | Rosenberg .............. | G06F 3/016 341/20 |
| 7,901,368 B2 | * | 3/2011 | Flaherty ................... | A61H 3/04 601/5 |
| 9,901,408 B2 | * | 2/2018 | Larkin .................... | A61B 90/36 |
| 2011/0082566 A1 | * | 4/2011 | Herr .......................... | A61F 2/72 623/24 |
| 2012/0086659 A1 | * | 4/2012 | Perlin ..................... | G06F 3/045 345/173 |
| 2014/0206953 A1 | * | 7/2014 | Valdastri ............... | A61B 5/0053 600/301 |
| 2014/0366646 A1 | | 12/2014 | Matsuzawa et al. | |
| 2016/0059412 A1 | * | 3/2016 | Oleynik ............... | B62D 57/032 700/257 |
| 2016/0158086 A1 | * | 6/2016 | Schmitt ................ | A61H 1/0255 601/27 |
| 2017/0296189 A1 | * | 10/2017 | Vendely ............... | A61B 17/068 |
| 2017/0348854 A1 | * | 12/2017 | Oleynik .................. | A47J 47/02 |

FOREIGN PATENT DOCUMENTS

JP 2015-001384 A 1/2015

* cited by examiner

*Primary Examiner* — Ronnie M Mancho

(74) *Attorney, Agent, or Firm* — Harness, Dickey & Pierce, P.L.C.

(57) ABSTRACT

A force detection system includes a force detection unit that outputs a signal corresponding to an external force, a first output unit that outputs first data based on a signal output from the force detection unit, and a second output unit that outputs second data based on the signal output from the force detection unit in a system different from the first output unit. The first data and the second data are different.

20 Claims, 7 Drawing Sheets

FORCE DETECTION SYSTEM AND ROBOT

BACKGROUND

1. Technical Field

The present invention relates to a force detection system and a robot.

2. Related Art

A robot such as a vertical articulated robot, a horizontal articulated robot, or the like includes a robot arm, and in general, an end effector such as a hand is attached to the tip end of the robot arm.

For example, the robot disclosed in JP-A-2015-1384 includes an arm, an end effector provided on the tip end side of the arm, and a force detection device provided between the arm and the end effector. Here, the force detection device detects an external force applied to the end effector. This detection result is used for drive control of the arm.

However, in the robot described in JP-A-2015-1384, since an output of the force detection device is one system, the detection result of the force detection device cannot be used other than the drive control of the robot arm, and the detection result of the force detection device cannot be fully utilized in some cases.

SUMMARY

An advantage of some aspects of the invention is to provide a force detection system with excellent convenience, high accuracy, and high sensitivity, and to provide a robot including the force detection system.

The invention can be implemented as the following application examples or forms.

A force detection system according to an application example includes a force detection unit that outputs a signal corresponding to an external force, a first output unit that outputs first data based on a signal output from the force detection unit, and a second output unit that outputs second data based on the signal output from the force detection unit in a system different from the first output unit.

According to such a force detection system, since the first data and the second data based on the signal output from the force detection unit are output from the first output unit and the second output unit of different systems, first data and second data can be used for different purposes. For that reason, it is possible to provide a force detection system excellent in convenience.

In the force detection system according to the application example, it is preferable that the first data and the second data are different from each other.

With this configuration, it is possible to widen a range of utilization purpose of the first data and the second data.

In the force detection system according to the application example, it is preferable that a first signal processing circuit that converts a signal output from the force detection unit into a signal conforming to a communication protocol and outputs the signal, and a second signal processing circuit that down-samples and outputs a signal output from the force detection unit are further included, and the signal output from the first signal processing circuit is used as the first data and the signal output from the second signal processing circuit is used as the second data.

With this configuration, it is possible to obtain first data and second data, for which two pieces of data different in a sampling rate and resolution are used, from the signal output from the force detection unit. Here, it is possible to suitably use first data having a high sampling rate and high resolution for use requiring detailed force sense data (the result based on a signal output from the force detection unit). Further, it is possible to suitably use the second data having a low sampling rate and low resolution for use such as control with a long control period.

In the force detection system according to the application example, it is preferable that a memory that stores data based on the signal output from the force detection unit is further included, and the first output unit outputs the first data using data stored in the memory.

With this configuration, it is possible to reduce load of processing such as transfer, computation, and the like relating to high resolution data from the force detection unit.

In the force detection system according to the application example, it is preferable that the first signal processing circuit includes a peak hold circuit that holds and detects a maximum value or a minimum value of the signal output from the force detection unit is further included, and the first data is data using the detection result of the peak hold circuit.

With this configuration, for example, it is possible to perform collision detection (determination as to whether or not another object collides against a structure on which the force detection element is installed) with high accuracy or high sensitivity using the first data.

In the force detection system according to the application example, it is preferable that the first signal processing circuit includes a Fourier transform circuit that Fourier-transforms and outputs the signal output from the force detection unit is further included, and the first data is data including the output result of the Fourier transform circuit.

With this configuration, internal diagnosis (determination on the presence or absence or degree of cracks, voids, and the like inside another object in contact with a structure on which the force detection unit is installed) of a target can be performed using the first data.

In the force detection system according to the application example, it is preferable that the first output unit includes a transmission circuit capable of wirelessly transmitting the first data.

With this configuration, the number of wirings can be reduced, and as a result, convenience can be further improved. Further, for example, in a case where the force detection system is used for inspection such as click feeling inspection of a wirelessly receivable device such as a smartphone, the first data can be transmitted to the device which is a target to be inspected and the device can be adjusted.

In the force detection system according to the application example, it is preferable that a data transfer rate of the first output unit and a data transfer rate of the second output unit are different from each other.

With this configuration, it is possible to optimize the transfer rate according to the use of the first data and the second data.

A robot according to an application example includes a force detection system of the application example, a robot main body in which the force detection unit is disposed, and a control device to which at least one of a first data and a second data is input and which controls a drive unit of the robot main body.

According to such a robot, by utilizing excellent convenience of the force detection system, it is possible to widen the range of use of the robot and to enhance safety of the robot.

In the robot according to the application example, it is preferable that a storage device that records a history of the first data is further included, and the second data is used by the control device as a control signal of the drive unit of the robot main body.

According to such a robot, it is possible to prevent failure of the robot and occurrence of a defective product in advance.

In the robot according to the application example, it is preferable that the second data is used by the control device as a control signal of the drive unit of the robot main body, and an operation to be performed next by the robot is determined according to information included in the first data and an operation trajectory of the robot is changed.

According to such a robot, by using a highly accurate output signal from the force detection system, the force applied to the target according to the operation of the robot can be accurately ascertained and then the operation to be performed by the robot can be selected and thus, quality and yield of the product manufactured by the robot can be improved.

In the robot according to the application example, it is preferable that the second data is used by the control device as a control signal of the drive unit of the robot main body and tactile feeling is inspected when the target is operated, according to information included in the first data.

According to such a robot, since force sense data with high sampling rate and high resolution can be used, the tactile feeling can be inspected with high precision or at high speed.

In the robot according to the application example, it is preferable to use the second data by the control device as a control signal of the drive unit of the robot main body, and to detect that any one of the robot main body, the end effector, and a target to be gripped comes into contact with another object, according to the information included in the first data.

According to such a robot, the delay time can be short or reliably detected by fast and detailed force sense data from the force detection system.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the following, a force detection system and a robot according to the invention will be described in detail based on preferred embodiments illustrated in the attached drawings.

First Embodiment

Figure 1:
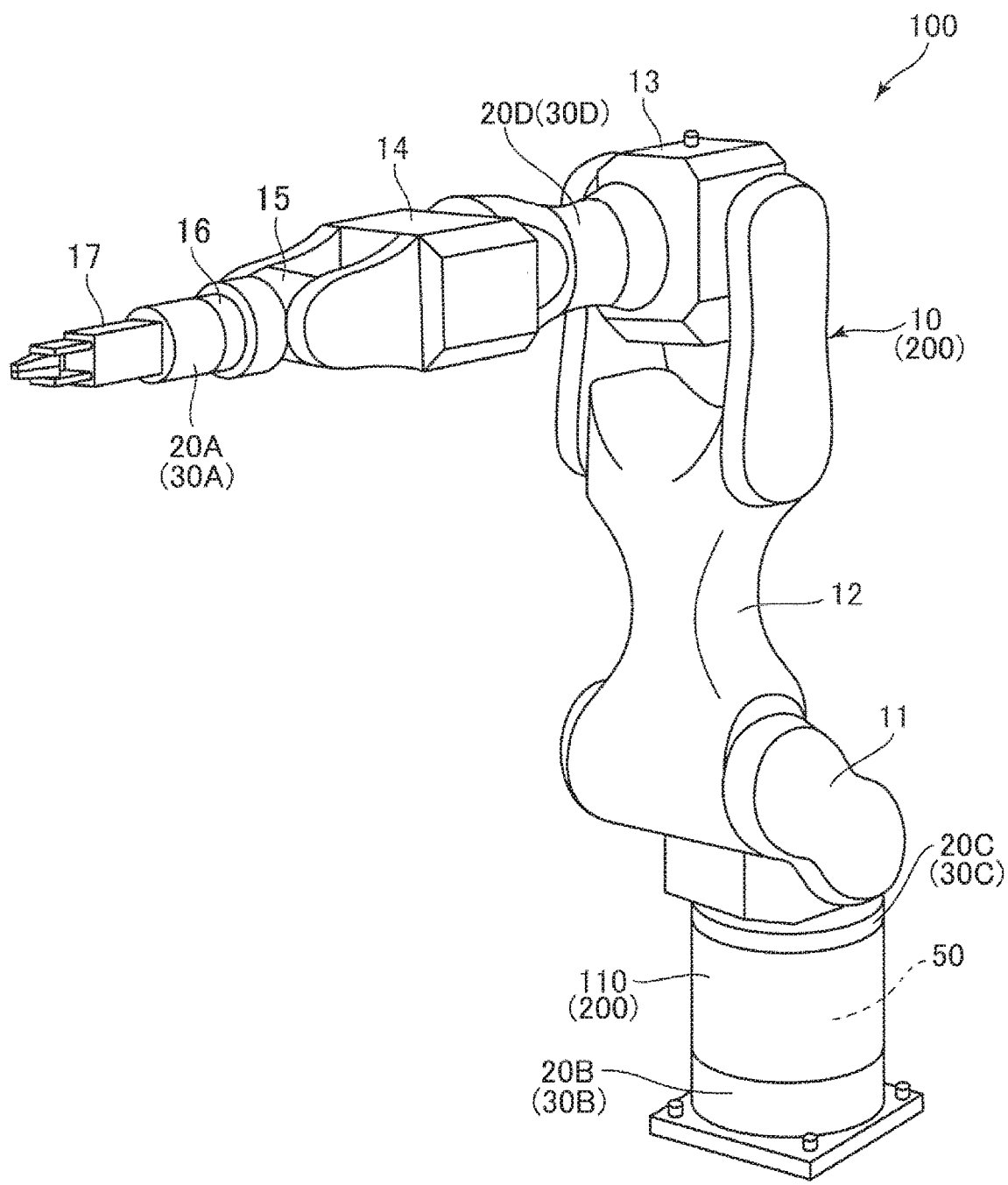
FIG. 1 is a perspective view illustrating a robot according to a first embodiment of the invention.
Figure 2:
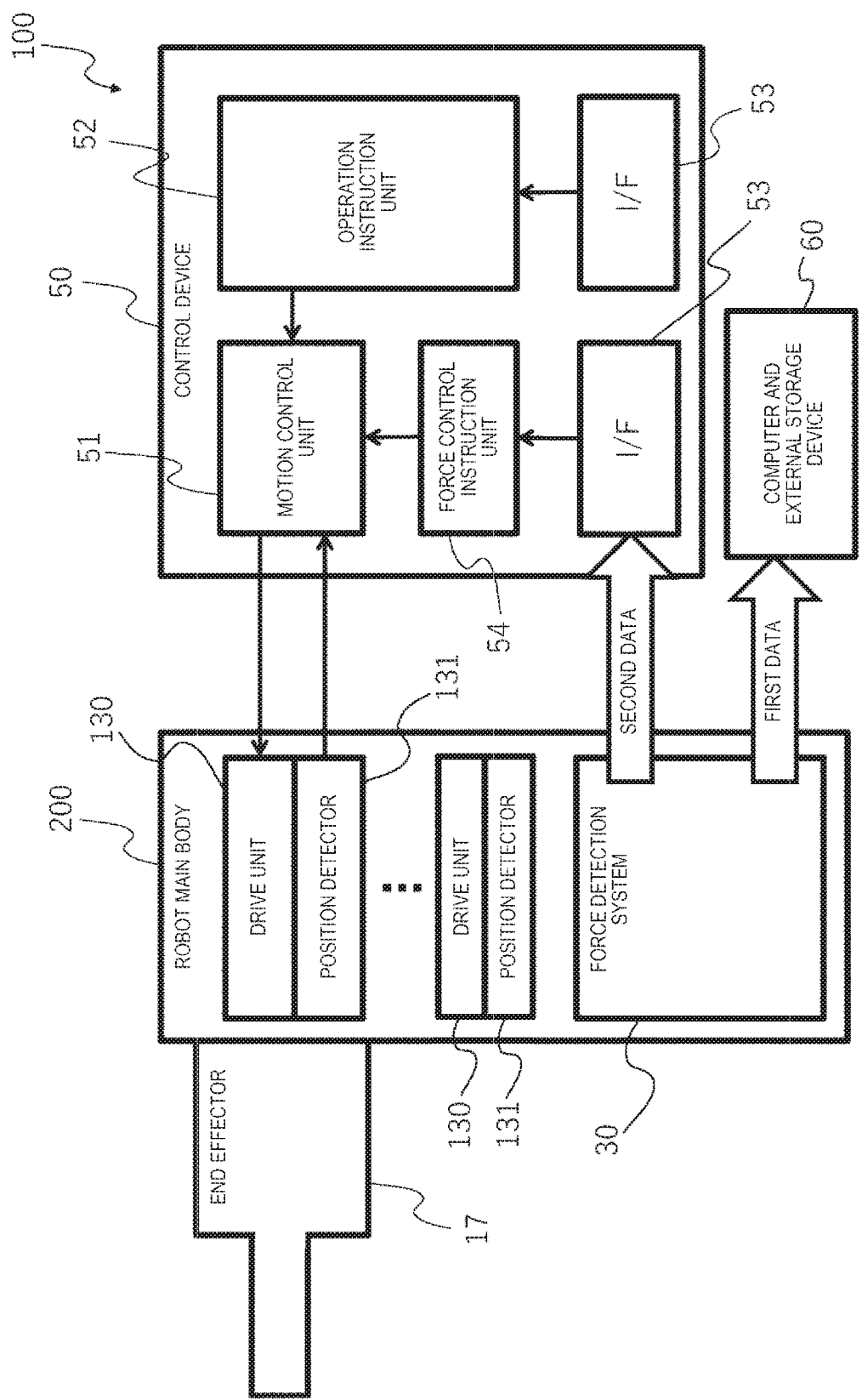
FIG. 2 is a block diagram of the robot illustrated in FIG. 1.
Figure 3:
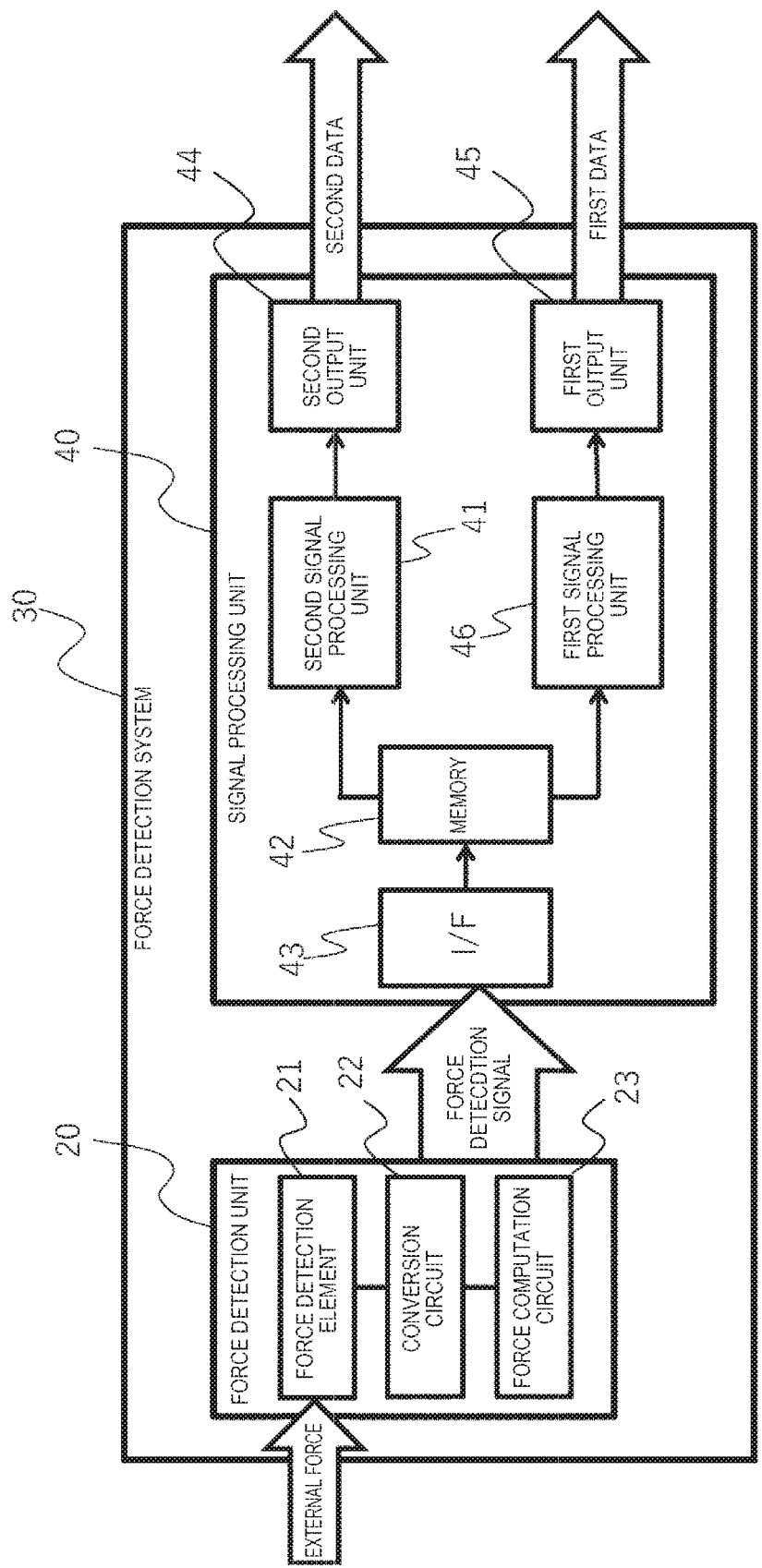
FIG. 3 is a block diagram of a force detection system according to the first embodiment of the invention.
Figure 4:
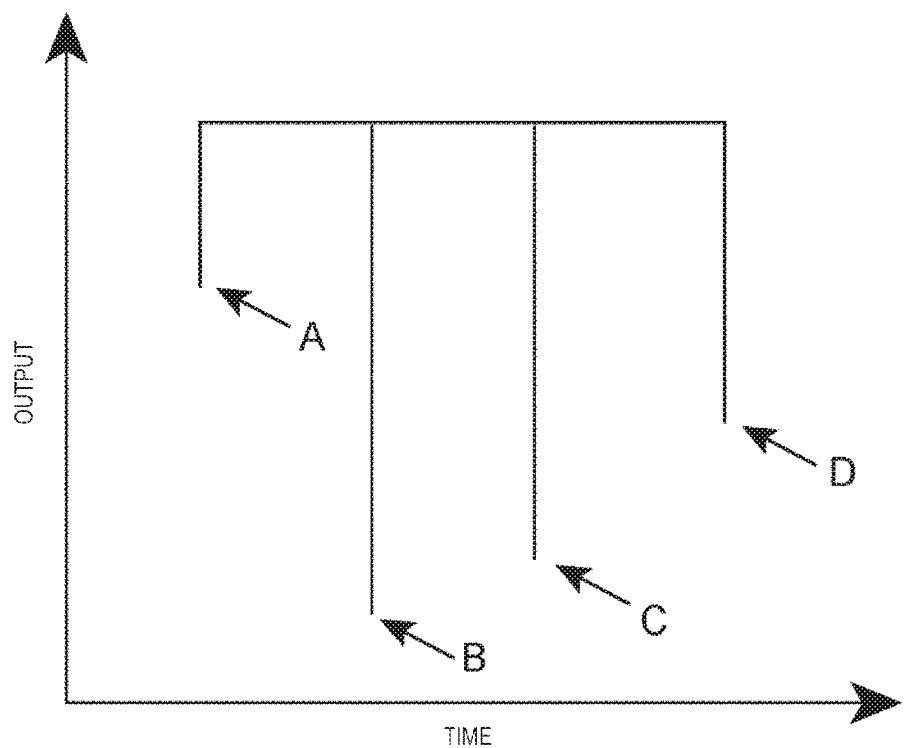
FIG. 4 is a graph illustrating an output of the force detection unit when sampling is performed at high speed.
Figure 5:
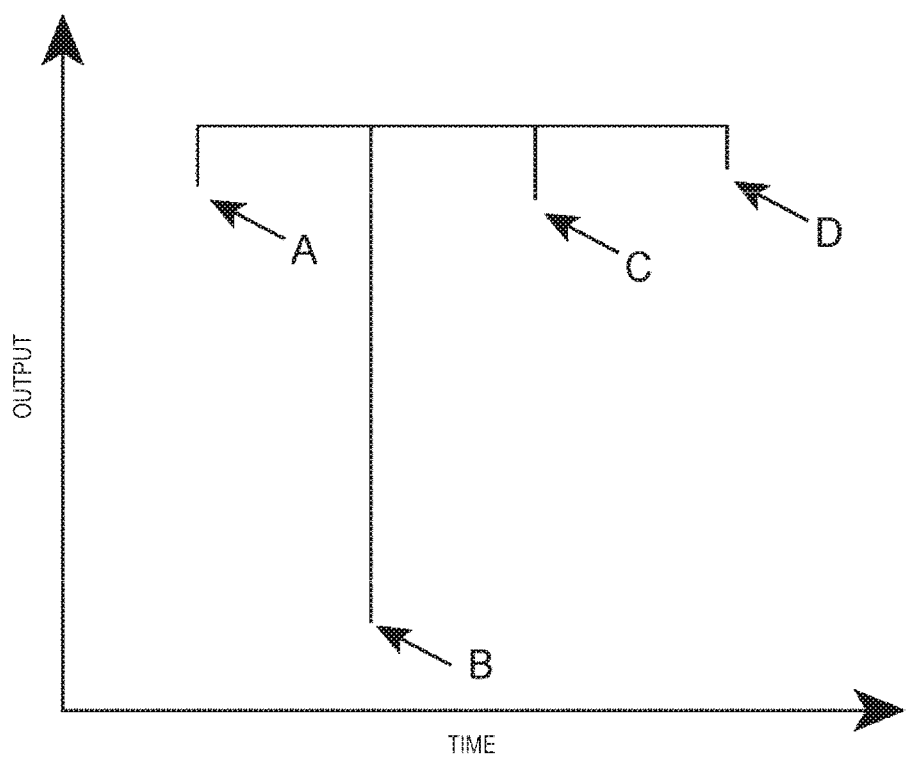
FIG. 5 is a graph illustrating the output of the force detection unit when sampling is performed at low speed.
Figure 6:
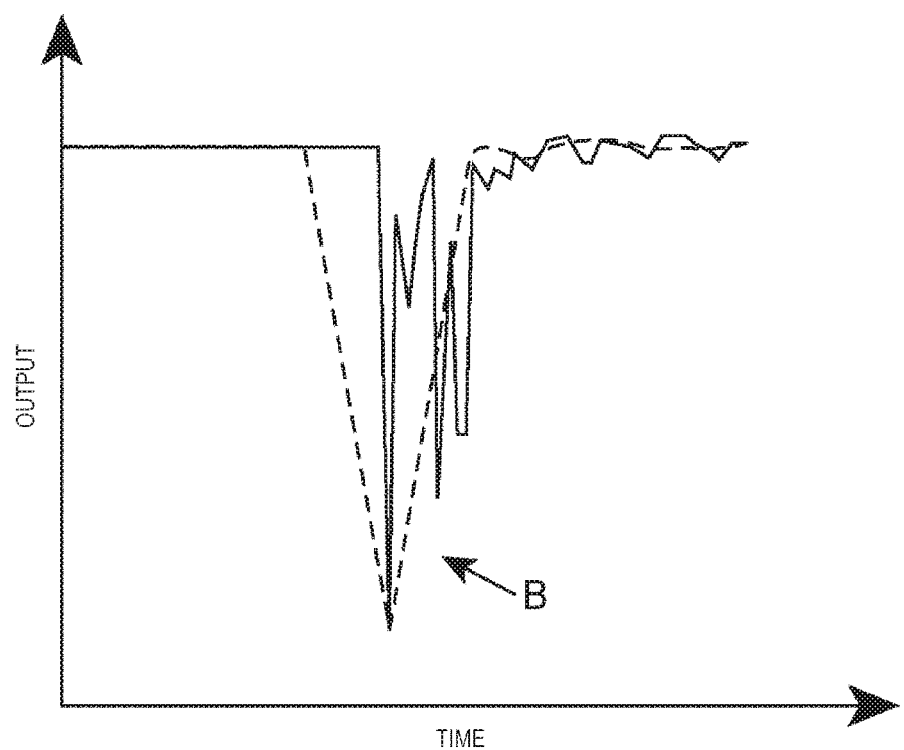
FIG. 6 is a graph enlarging the bottom B portion in FIG. 4 and FIG. 5.

FIG. 1 is a perspective view illustrating a robot according to a first embodiment of the invention. FIG. 2 is a block diagram of the robot illustrated in FIG. 1. FIG. 3 is a block diagram of a force detection system according to the first embodiment of the invention. FIG. 4 is a graph illustrating an output of the force detection unit when sampling is performed at high speed. FIG. 5 is a graph illustrating the output of the force detection unit when sampling is performed at low speed. FIG. 6 is a graph enlarging the bottom B portion in FIG. 4 and FIG. 5. In the following description, the base 110 side of a robot 100 is referred to as a "base end side", and the opposite side (end effector 17 side) is referred to as a "tip end side".

The robot 100 illustrated in FIG. 1 is a so-called six axis vertical articulated robot. For example, the robot 100 can perform works such as feeding material, removing material, transporting, and assembling of precision instruments and constituent parts (targets) thereof. As illustrated in FIG. 1, the robot 100 includes the base 110, a robot movable unit 10 pivotably connected to the base 110, a control device 50, a force detection system 30, and the end effector 17. The base 110 and the robot movable unit 10 constitute a robot main body 200. The force detection system 30 including a force detection unit 20 is mounted on the tip end portion of the robot main body 200 and the end effector 17 is further mounted on the force detection unit 20.

The base 110 is fixed, for example, to a floor, a wall, a ceiling, a movable carriage, and the like. The robot movable unit 10 includes an arm 11 (first arm) pivotably connected to the base 110, an arm 12 (second arm) pivotably connected to the arm 11, an arm 13 (third arm) pivotably connected to the arm 12, an arm 14 (fourth arm) pivotably connected to the arm 13, an arm 15 (fifth arm) pivotably connected to the arm 14, and an arm 16 (sixth arm) pivotably connected to the arm 15. Portions each of which bends and pivots two members connected with each other among the base 110 and the arms 11 to 16 constitutes a "joint portion". The end effector 17 is mounted on the tip end surface of the arm 16 via the force detection unit 20. The force detection unit 20 is also mounted on the base end surface (20B) of the base 110, each joint portion (20C), and each arm intermediate portion (20D). These force detection units 20 may be mounted on a plurality of places at any one place of the robot main body 200, or a plurality of the force detection units 20 may be mounted at one place.

As illustrated in FIG. 2, the robot 100 includes a drive unit 130 for driving each joint portion of the robot main body 200 and a position detector 131 for detecting a drive state (for example, a rotation angle) of each joint portion of the robot main body 200. One or more drive units 130 and position detectors 131 may be provided for each arm of the arms 11 to 16, and a single arm may be provided with the plurality of drive units 130 and position detectors 131. The drive unit 130 is configured to include, for example, a servo motor and reduction gear. The position detector 131 is configured to include, for example, a magnetic or optical rotary encoder.

The control device 50 illustrated in FIGS. 1 and 2 has a function of controlling driving of the robot movable unit 10 based on the detection results of the position detector 131 and the force detection unit 20. The control device 50 is constituted with a motion control unit 51, an operation instruction unit 52, an interface circuit (I/F) 53, and a force control instruction unit 54. The motion control unit 51 drives a motor included in the drive unit 130 based on an operation command value from the operation instruction unit 52, a force command value from the force control instruction unit 54, and position information of the position detector 131. The operation instruction unit 52 is constituted with a processor such as a central processing unit (CPU) and a memory such as a read only memory (ROM), a random access memory (RAM), and the like, generates an operation trajectory of the robot main body 200 based on a program or teaching data stored in the memory, and sends the operation command value to the motion control unit 51. The interface circuit (I/F) 53 is configured to be able to communicate with a signal processing unit 40. The force control instruction unit 54 generates a force control command based on force detection data output from the force detection system and sends the force control command value to the motion control unit 51.

The control device 50 is disposed inside the base 110 of the robot 100 in the drawing, but is not limited thereto, and may be disposed outside the base 110, for example. A display device including a monitor such as a display, an input device including, for example, a mouse and a keyboard, or the like, may be connected to the control device 50.

As illustrated in FIG. 3, the force detection system 30 includes the force detection unit 20 and the signal processing unit 40.

The force detection unit 20 is, for example, a six-axis force sensor capable of detecting six-axis component of external force applied to the force detection unit 20. Here, the six-axis component is translational force component in the direction of each of the three mutually orthogonal axes and rotational force (moment) component around the respective axes of the three axes. The number of detection axes of the force detection unit 20 is not limited to six, and may be, for example, one or more and five or less.

The force detection unit 20 includes a pair of plates (not illustrated), one of the pair of plates is fixed to the base end side of the robot main body 200, and the other is fixed to the tip end side of the robot main body 200. As illustrated in FIG. 3, the force detection unit 20 includes a force detection element 21, a conversion circuit 22, and a force computation circuit 23. The force detection element 21 outputs a signal corresponding to the force applied between the pair of plates (not illustrated). Here, if a piezoelectric element made of quartz is used for the force detection element 21, a force detection system capable of responding at high speed with high rigidity can be configured. The conversion circuit 22 converts a signal output from the force detection element 21 into a digital signal of a predetermined sampling frequency. In a case where a piezoelectric element is used for the force detection element 21, analog charge output from the element can be converted into an analog voltage by a charge amplifier, and the analog voltage signal can be converted into a digital signal by an AD conversion circuit. The force computation circuit 23 computes a force detection signal using digitally converted output signals from a plurality of force detection elements and a calibration parameter and a temperature correction parameter of each element, and transfers the force detection signal to the signal processing unit 40 as force sense data. Here, it is possible to obtain more detailed force sense data by increasing the sampling frequency and resolution of the conversion circuit 22.

The signal processing unit 40 has a function of outputting first data and second data based on force sense data transferred from the force detection unit 20. In this embodiment, the first data has the same amount of information as the force sense data transferred from the force detection unit 20. The second data is data converted so as to be suitable for utilizing the force sense data transferred from the force detection unit 20 in the control device 50. Then, the signal processing unit 40 transfers the second data to the control device 50, and transfers the first data to a computer and external storage device 60 provided separately from the control device 50.

More specifically, the signal processing unit 40 includes a first signal processing circuit 46, a first output unit 45, a second signal processing circuit 41, a second output unit 44, a memory 42, and an I/F 43. The first signal processing circuit 46 keeps the force sense data (high speed sampling data) transferred from the force detection unit 20 as high speed sampled data having an equivalent information amount, and converts the force sense data into first data of which the communication protocol (communication procedure) matches the computer or external storage device 60 each of which is an output destination. The first signal processing circuit may be configured to include a peak hold circuit that captures the maximum value or the minimum value of the force sense data transferred from the force detection unit 20 and holds the maximum value or the minimum value as its peak value and detects the maximum value or the minimum value, a signal processing circuit such as a Fourier transform circuit (FFT) that converts force sense data transferred from the force detection unit 20 into spectral intensity data by the Fourier transform, and these circuit outputs may be included in the first data. With such a configuration, detailed signal analysis results using the force sense data of high speed sampling transferred from the force detection unit 20 can be included in the first data. The second signal processing circuit 41 converts (down-samples) the force sense data (high speed sampling data) transferred from the force detection unit 20 to be suitable for a force control period of the control device 50, which is a transfer destination of the second output unit 44 and generates second data (low speed sampling data). The memory 42 temporarily accumulates (stores) the force sense data (high speed sampling data) transferred from the force detection unit 20. The I/F 43 is configured to be able to communicate with the force computation circuit 23 of the force detection unit 20, and receives the force sense data from the force detection unit 20. The second output unit 44 includes an input and output terminal such as an I/F circuit and a connector, is configured to be able to communicate with the control device 50, and transmits second data from the second signal processing circuit 41 to the control device 50. The first output unit 45 includes an input and output terminal such as an I/F circuit and a connector, is configured to be able to communicate with the computer or external storage device 60, and transmits the first data stored in the memory 42 to the computer or external storage device 60. The first output unit may include a transmission circuit. The transmission circuit is configured to be able to wirelessly communicate with a reception device, and transmits the first data stored in the memory 42 to the reception device. As the transmission circuit, a transceiver which is determined according to a communication standard of the reception device, and is not particularly limited, but, is compatible with a short distance wireless communication standard, for example, Bluetooth (registered trademark) (including BTLE: Bluetooth Low Energy), Wireless Fidelity (Wi-Fi) (registered trademark), Zigbee (registered trademark), Near field communication (NFC), and ANT+ (registered trademark), is included.

The reception device is not particularly limited as long as it is a device capable of wirelessly communicating with the transmission circuit, and examples thereof include a smartphone, a tablet terminal, and the like.

The signal processing circuit as described above can be configured using, for example, an application specific integrated circuit (ASIC) or a field-programmable gate array (FPGA). A general digital interface circuit can be used for the I/F 43, the first output unit 45, and the second output unit 44. For example, the I/F 43, the first output unit 45, and the second output unit 44 can be constituted with various ICs for constructing a serial interface such as RS422 or USB or a parallel interface such as ISA or PCI.

The signal processing unit 40 may be configured separately from the force detection unit 20, may be installed on the surface of the robot movable unit 10 or the base 110, may be disposed inside the control device 50, or may be disposed inside the force detection unit 20.

The computer and external storage device 60 are, for example, a personal computer and a large-scale storage device such as a hard disk (HDD), and include a processor such as a central processing unit (CPU), a memory such as a read only memory (ROM), a random access memory (RAM) or the like, an interface circuit (I/F), and a magnetic disk device (not illustrated). Here, in the personal computer, processing such as analysis of first data can be performed by appropriately reading the stored first data and data analysis program, and the like from the HDD to be executed by the processor.

Here, since the force sense data transferred from the force detection unit 20 is high speed sampling data, for example, when a hard object comes in contact with the force detection unit, a highly accurate force sense profile as illustrated in FIG. 4 can be obtained. On the contrary, in a case where the force sense data transferred from the force detection unit 20 is low speed sampling data, in the obtained force sense profile, for example, as illustrated in FIG. 5, falloffs of bottoms A, C, and D indicating force sense fluctuation occur. That is, in a case where contact detection is performed, the output peak may be missed and detection with high reliability cannot be performed at a low sampling rate, but an output peak can be accurately detected and reliable contact detection becomes possible at a high sampling rate.

If the force sense data transferred from the force detection unit 20 is high speed sampling data, in the obtained force sense profile, falloffs of bottoms A, B, C, and D that indicates force sense fluctuations are not included, and as indicated by the solid line in FIG. 6, detailed force sense data can be obtained as compared with the case where the force sense data transferred from the force detection unit 20 is low speed sampling data (indicated by a broken line in FIG. 6). For that reason, it is possible to diagnose cracks, voids, and the like inside the other object such as metal.

The force detection system 30 as described above includes the force detection unit 20 for outputting a signal corresponding to an external force, the first output unit 45 that is an interface (I/F) for outputting first data based on the signal output from the force detection unit 20, and the second output unit 44 which is an I/F for outputting second data based on the signal output from the force detection unit 20 in a system different from that of the first output unit 45. Here, the expression "output in a different system" is a concept including not only the case of outputting data from different interfaces (I/F) as in this embodiment but also the case of outputting data from different terminals, the case of outputting data from different connectors, and the like.

According to such a force detection system 30, since the first data and the second data based on the signal output from the force detection unit 20 are output from I/Fs (first output unit 45 and second output unit 44) that belong to different systems, the first data and the second data can be used for different purposes. For that reason, it is possible to provide the force detection system 30 that is excellent in convenience.

Here, the first data and the second data are different from each other. With this configuration, it is possible to widen the range of utilization purpose of the first data and the second data. In this embodiment, although the first data and the second data are both force sense data, the sampling rate of the first data is higher than the sampling rate of the second data. The expression "The first data and the second data are different from each other" means that these data are generated by mutually different processing, the invention is not limited to the case where the sampling rates of these data are different, and the expression is a concept including the case where data format, amount of data, amount of information, and the like are different.

The force detection system 30 of this embodiment includes the first signal processing circuit 46 for converting a signal output from the force detection unit 20 into a signal conforming to a communication protocol and outputting the signal, and the second signal processing circuit 41 for down-sampling and outputting the signal output from the force detection unit 20. The signal output from the first signal processing circuit 46 is used as the first data, while the signal output from the second signal processing circuit 41 is used as the second data. In this case, the first signal processing circuit 46 is preferably configured to output data having the same information amount with respect to the input signal.

As such, it is possible to obtain first data and second data using two data different in the sampling rate and resolution from the signal output from the force detection unit 20. Here, it is possible to suitably use the first data having a high sampling rate and high resolution for use requiring detailed force sense data (result based on a signal output from the force detection unit 20). In this embodiment, it is possible to analyze the external force applied to the end effector 17 in the computer and external storage device 60 using the first data in detail. On the other hand, it is possible to suitably use the second data having a low sampling rate and resolution for use such as control with a long control period (in this embodiment, drive control of the robot movable unit 10 by the control device 50). The computer and external storage device 60 may be communicably connected to the control device 50. In this case, the control device 50 can control driving of the robot movable unit 10 based on the analysis result of the computer and external storage device 60.

As described above, the force detection system 30 includes the memory 42 that stores data based on the signal output from the force detection unit 20. Then, the first output unit 45 outputs the first data by using data stored in the memory 42. Here, the memory 42 functions as a cache. With this configuration, it is possible to reduce the load of processing such as transfer, computation, and the like relating to high resolution data from the force computation circuit 23 of the force detection unit 20.

The first signal processing circuit 46 includes a peak hold circuit that holds and detects the maximum value or the minimum value of the signal output from the force computation circuit 23 of the force detection unit 20. Then, the first data is data using the detection result of the peak hold circuit. With this configuration, for example, it is possible to perform contact detection (determination as to whether or not another object collides against the robot main body 200 and the end effector 17 on which the force detection unit 20 is installed) using the first data.

The first signal processing circuit 46 includes a Fourier transform circuit for Fourier transforming the signal output from the force detection unit 20 and outputting the Fourier transformed signal. In this case, the first data is data including the output result of the Fourier transform circuit. With this configuration, for example, internal diagnosis (determining the presence or absence or the degree of cracks, voids, and the like inside the other object such as metal contacting the end effector 17 on which the force detection element 21 is installed and the degree of cracks, voids, and the like) of the target can be performed using the first data.

The first output unit 45 includes a transmission circuit capable of wirelessly transmitting the first data. With this configuration, the number of wirings can be reduced, and as a result, convenience can be further improved. For example, in the case where the force detection system 30 is used for inspection such as the click feeling inspection of the wirelessly receivable device such as a smartphone, it is possible to transmit the first data to a device which is an inspection target and adjust the device.

Although the data transfer rates of the second output unit 44 and the first output unit 45 may be the same or different from each other, it is preferable that the data transfer rate of the first output unit 45 and the data transfer rate of the second output unit 44 are different from each other. With this configuration, the transfer rate can be optimized according to use of the first data and the second data. In particular, in the case of this embodiment, it is preferable that the data transfer rate of the first output unit 45 is higher than the data transfer rate of the second output unit 44. With this configuration, it is possible to quickly transfer the first data having a large amount of information to the computer and external storage device 60.

The robot 100 as described above includes the force detection system 30, the robot movable unit 10 in which the force detection unit 20 is disposed, and the control device 50 to which at least one of the first data and the second data (in this embodiment, the second data) is input and controls driving of the robot movable unit 10. According to such a robot 100, it is possible to widen the range of use of the robot 100 and to improve safety of the robot 100 by using excellent convenience of the force detection system 30.

The computer and external storage device 60 can accumulate the history of the detailed output signal from the force detection system 30 accompanying the operation of the robot 100, and the accumulated history of the detailed output signal can be used for defect analysis and traceability in a case where the operation of the robot 100 fails or the manufactured product is defective. Further, by specifying and monitoring a characteristic amount highly correlated with defects and occurrence of defective products from accumulated data, it is possible to prevent occurrence of failure of the robot 100 or defective products in advance.

Second Embodiment

Figure 7:
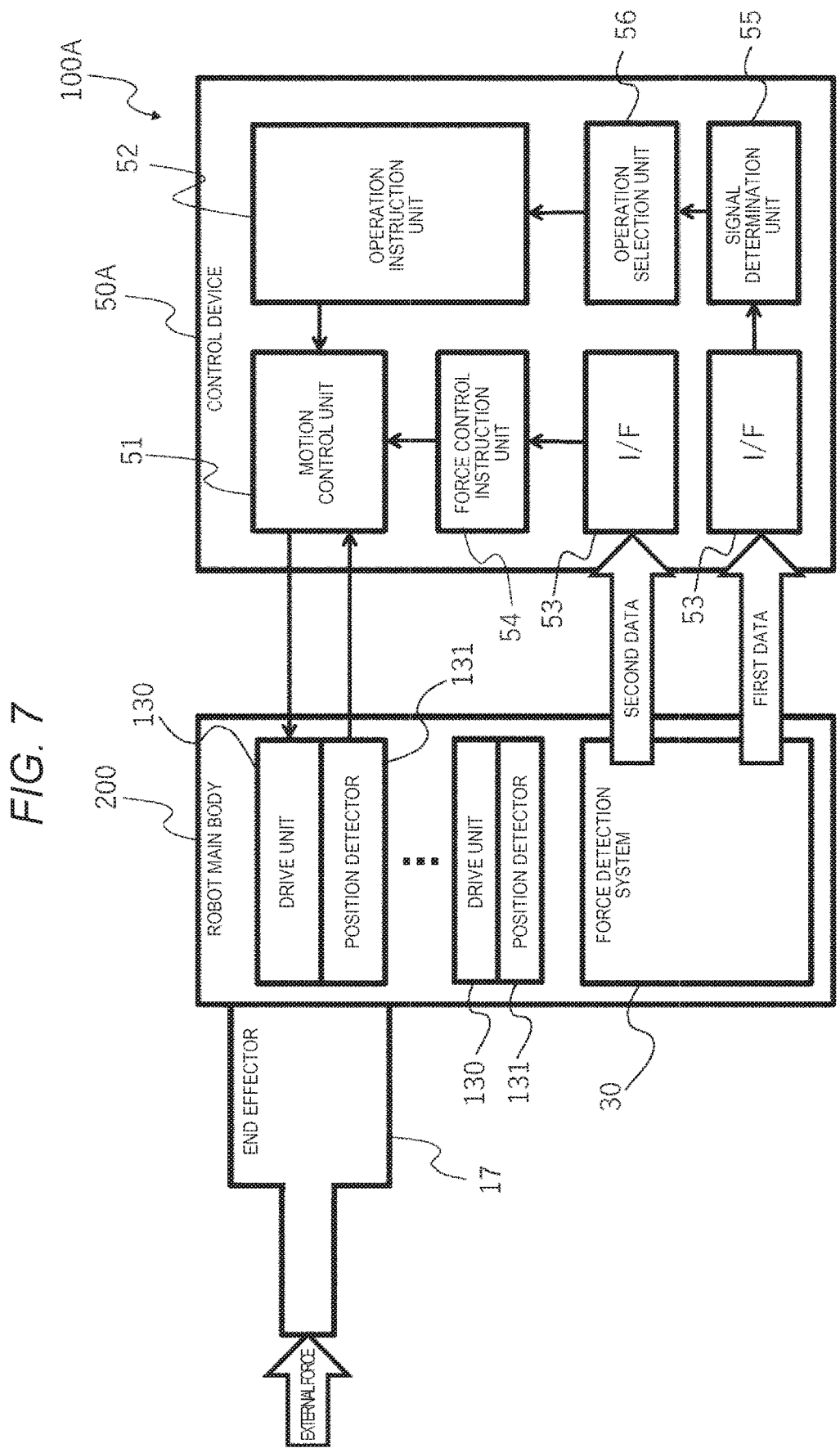
FIG. 7 is a block diagram of a robot according to a second embodiment of the invention.

FIG. 7 is a block diagram of a robot according to a second embodiment of the invention.

In the following, the second embodiment will be mainly described on differences from the embodiment described above, and description of similar matters will be omitted. In FIG. 7, the same reference numerals are given to the same configurations as in the embodiment described above.

A robot 100A illustrated in FIG. 7 includes a control device 50A.

The control device 50A includes a signal determination unit 55 and an operation selection unit 56. In the signal determination unit 55, the first data transferred from the force detection system 30 is input via an I/F 53, and determines a state of force applied to the target according to the operation of the robot. Specifically, for example, the maximum load, click feeling, tactile feeling, and the like when the target is pushed in are evaluated from the force data detected by the force detection unit 20, and the operation performed by the robot, pass or fail of the target, and the like are determined. The operation selection unit 56 receives the determination result in the signal determination unit 55, selects an operation instruction to be subsequently performed by the robot, and sends the operation instruction to the operation instruction unit 52.

The signal determination unit 55 can be constituted with an FPGA, a CPU, a DSP, a GPU, and the like, and is programmed to analyze input data at high speed and to output a determination.

The operation selection unit 56 can be configured to be included as a program in the operation instruction unit 52.

As described above, according to the robot of the second embodiment, by using the high accurate output signal from the force detection system 30, it is possible to accurately ascertain the force applied to the target according to the operation of the robot and then, it is possible to select the operation to be subsequently performed by the robot. For example, in a process that needs to be assembled within a determined force range, it is possible to accurately determine that work can be performed according to the standard, distinguish between a compatible article and an incompatible article, and convey the articles to different places. Accordingly, it is possible to improve quality and yield of the product manufactured by the robot.

According to the second embodiment as described above, it is possible to achieve the same effect as that of the first embodiment described above.

Third Embodiment

Figure 8:
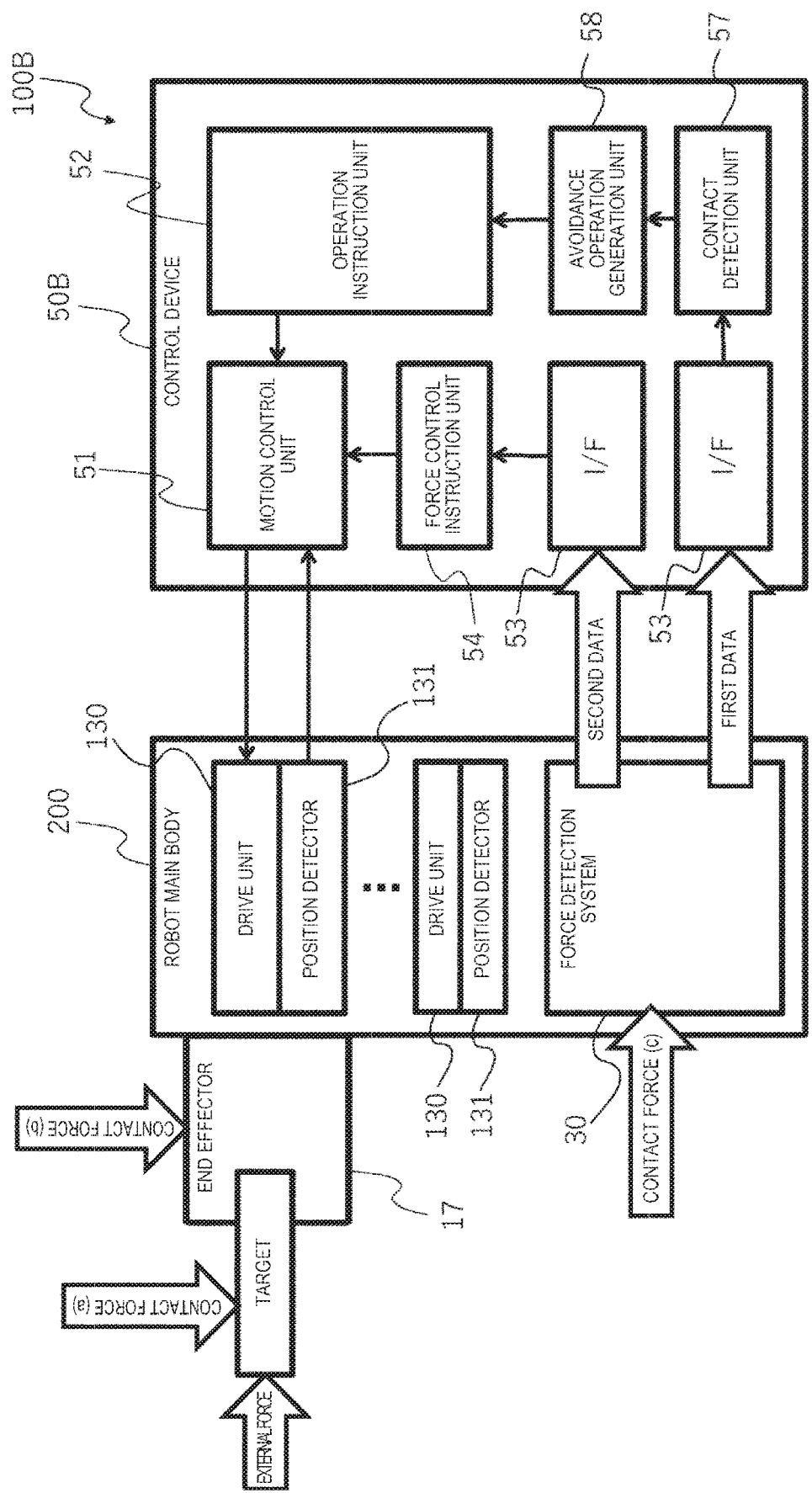
FIG. 8 is a block diagram of a robot according to a third embodiment of the invention.

FIG. 8 is a block diagram of a robot according to a third embodiment of the invention.

In the following, the third embodiment will be described mainly on differences from the embodiments described above, and description of similar matters will be omitted. In FIG. 8, the same reference numerals are given to the same configurations as in the embodiments described above.

A robot 100B illustrated in FIG. 8 includes a control device 50B.

The control device 50B includes a contact detection unit 57 and an avoidance operation generation unit 58. In the contact detection unit 57, the first data transferred from the force detection system 30 is input via the I/F 53, and contact is detected from force generated as the robot comes in contact with another object. Specifically, for example, the difference in force detection data from the normal work is detected from force data detected by the force detection unit 20 and contact between the robot main body 200, the end effector 17, the target gripped by the end effector 17, and another object is detected. The avoidance operation generation unit 58 receives the detection result in the contact detection unit 57, generates an operation of the robot so as to escape from contact, and sends an instruction relating to the generated operation to the operation instruction unit 52 as an operation instruction.

The contact detection unit 57 can be constituted with an FPGA, a CPU, a DSP, a GPU, and the like, and is programmed to analyze the input data at high speed and to output a determination.

The avoidance operation generation unit 58 can be configured to be included as a program in the contact detection unit 57.

As described above, according to the robot of the third embodiment, since it is possible to reliably detect that not only the robot main body but also the replaceable end effector and the target that is being gripped by the replaceable end effector come into contact with another object with a short delay time by high speed and detailed force sense data from the force detection system, it is possible to provide a cooperative robot that detects contact and stops safely.

According to the third embodiment as described above, the same effect as that of the first embodiment described above can be exhibited.

Although the force detection system and the robot according to the invention are described based on the illustrated embodiments, the invention is not limited thereto, and the configuration of each constitution element can be replaced with any configuration having the same function. Further, any other constituent elements may be added to the invention.

The invention may be a combination of any two or more configurations (features) of the embodiments described above.

The robot according to the invention is not limited to a single arm robot as long as the robot has a movable unit, and may be another robot such as a dual arm robot, a SCARA robot, a single axis robot, a gantry robot, or a parallel link robot. The number of arms (number of joints) included in the robot main body is not limited to the number (six) of those in the embodiments described above, and may be one or more to five or less, or seven or more.

In the embodiments described above, the case where the end effector is a hand is described as an example, but the end effector is not limited to the form of the illustrated hand, and is not limited to a hand, but various end effectors other than the hand may be available.

The entire disclosure of Japanese Patent Application No. 2017-219664, filed Nov. 15, 2017 is expressly incorporated by reference herein.

What is claimed is:

1. A force detection system comprising:
a force detection unit that outputs a signal corresponding to an external force;
a first output unit that outputs first data based on the signal output from the force detection unit; and
a second output unit that outputs second data based on the signal output from the force detection unit in a system different from the first output unit.

2. The force detection system according to claim 1, wherein the first data and the second data are different.

3. The force detection system according to claim 2, further comprising:
a first signal processing circuit that converts the signal output from the force detection unit into a converted signal conforming to a communication protocol and outputs the converted signal; and
a second signal processing circuit that down-samples the signal output from the force detection unit into a down-sampled signal and outputs the down-sampled signal,
wherein the converted signal output from the first signal processing circuit is used as the first data and the down-sampled signal output from the second signal processing circuit is used as the second data.

4. The force detection system according to claim 3, further comprising:
a memory that stores data based on the signal output from the force detection unit,
wherein the first output unit outputs the first data using the data stored in the memory.

5. The force detection system according to claim 3, wherein the first signal processing circuit includes a peak hold circuit that holds and detects a maximum value or a minimum value of the signal output from the force detection unit, and
the first data is data using a detection result of the peak hold circuit.

6. The force detection system according to claim 3, wherein the first signal processing circuit includes a Fourier transform circuit that Fourier-transforms the signal output from the force detection unit to output a result, and
the first data is data including the output result of the Fourier transform circuit.

7. The force detection system according to claim 1, wherein the first output unit includes a transmission circuit capable of wirelessly transmitting the first data.

8. The force detection system according to claim 1, wherein a data transfer rate of the first output unit and a data transfer rate of the second output unit are different.

9. A robot comprising:
the force detection system according claim 1;
a robot main body in which the force detection unit is disposed; and
a control device to which the first data or the second data is input and which controls a drive unit of the robot main body.

10. A robot comprising:
the force detection system according claim 2;
a robot main body in which the force detection unit is disposed; and
a control device to which the first data or the second data is input and which controls a drive unit of the robot main body.

11. A robot comprising:
the force detection system according claim 3;
a robot main body in which the force detection unit is disposed; and
a control device to which the first data or the second data is input and which controls a drive unit of the robot main body.

12. A robot comprising:
the force detection system according claim 4;
a robot main body in which the force detection unit is disposed; and
a control device to which the first data or the second data is input and which controls a drive unit of the robot main body.

13. A robot comprising:
the force detection system according claim 5;
a robot main body in which the force detection unit is disposed; and a control device to which the first data or the second data is input and which controls a drive unit of the robot main body.

14. A robot comprising:
the force detection system according claim 6;
a robot main body in which the force detection unit is disposed; and
a control device to which the first data or the second data is input and which controls a drive unit of the robot main body.

15. A robot comprising:
the force detection system according claim 7;
a robot main body in which the force detection unit is disposed; and
a control device to which the first data or the second data is input and which controls a drive unit of the robot main body.

16. A robot comprising:
the force detection system according claim 8;
a robot main body in which the force detection unit is disposed; and
a control device to which the first data or the second data is input and which controls a drive unit of the robot main body.

17. The robot according to claim 9, further comprising:
a storage device that records a history of the first data, wherein the second data is used by the control device as a control signal of the drive unit of the robot main body.

18. The robot according to claim 9,
wherein the second data is used by the control device as a control signal of the drive unit of the robot main body, and
wherein an operation to be performed next by the robot is determined according to information included in the first data and wherein an operation trajectory of the robot is changed.

19. The robot according to claim 9,
wherein the second data is used by the control device as a control signal of the drive unit of the robot main body, and
wherein tactile feeling is inspected when a target is operated according to information included in the first data.

20. The robot according to claim 9,
wherein the second data is used by the control device as a control signal of the drive unit of the robot main body, and
contact of any one of the robot main body, the end effector, and a target to be gripped with another object is detected according to the information included in the first data.

* * * * *